United States Patent [19]

Ayoub et al.

[11] 4,356,724

[45] Nov. 2, 1982

[54] APPARATUS AND METHOD FOR TESTING TRANSMISSIONS

[75] Inventors: Stephen J. Ayoub, 900 Rolling Hills Dr., Palm Harbor, Fla. 33563; Douglas MacPherson, Tampa; Thomas Rizzo, Dover, both of Fla.

[73] Assignee: Stephen J. Ayoub, Palm Harbor, Fla.

[21] Appl. No.: 186,170

[22] Filed: Sep. 11, 1980

[51] Int. Cl.³ ............................................. G01M 13/02
[52] U.S. Cl. .................................................... 73/118
[58] Field of Search ............................ 73/118, 862, 168

[56] References Cited

U.S. PATENT DOCUMENTS

| | | | |
|---|---|---|---|
| 2,918,822 | 12/1959 | Mann, Jr. | 73/118 UX |
| 3,016,740 | 1/1962 | Raidl | 73/118 |
| 3,060,730 | 10/1962 | Lucia | 73/118 |

Primary Examiner—Jerry W. Myracle
Attorney, Agent, or Firm—Stefan Stein

[57] ABSTRACT

An apparatus and method is disclosed for testing automatic vehicular transmissions. The transmission tester of the invention includes input adjustment elements and output adjustment elements which permit various makes and models of transmissions to be installed in the tester for testing. The torque converter of the transmission under test is operatively connected to a drive shaft of the transmission tester. The output of the transmission under test is operatively connected to a load device which provides a loading torque to the output shaft. During the test procedure, the torque converter is rotated at varying speeds while a loading torque is imparted to the output shaft. A vacuum is supplied to the vacuum modulator control of the transmission under test, and the hydraulic pressure of the transmission under test is monitored. A microcomputer controls and monitors the test procedure such that the transmission under test is subjected to a test procedure designed to determine whether the test transmission upshifted and downshifted within prescribed limits set by the manufacturer thereof.

39 Claims, 10 Drawing Figures

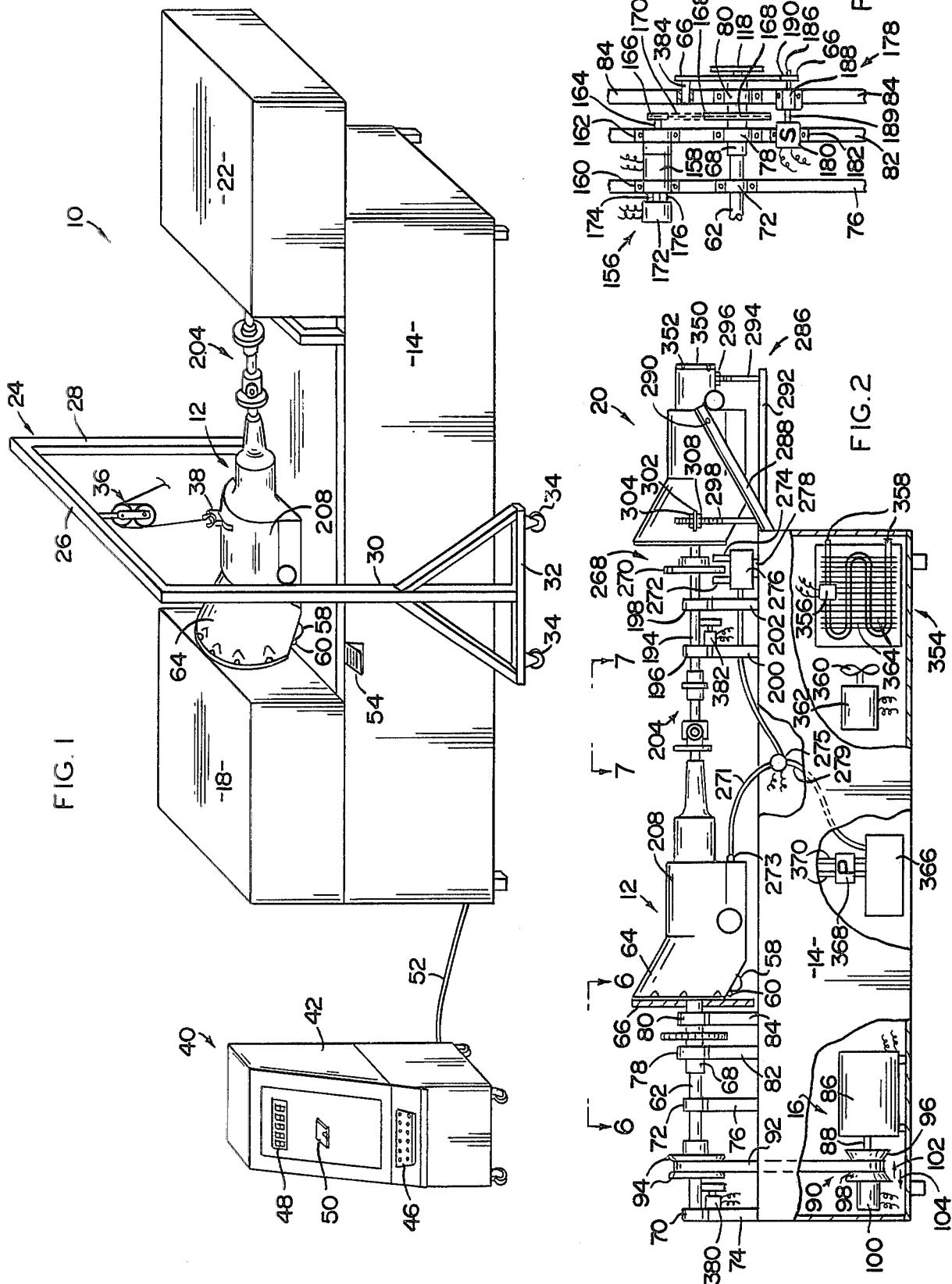

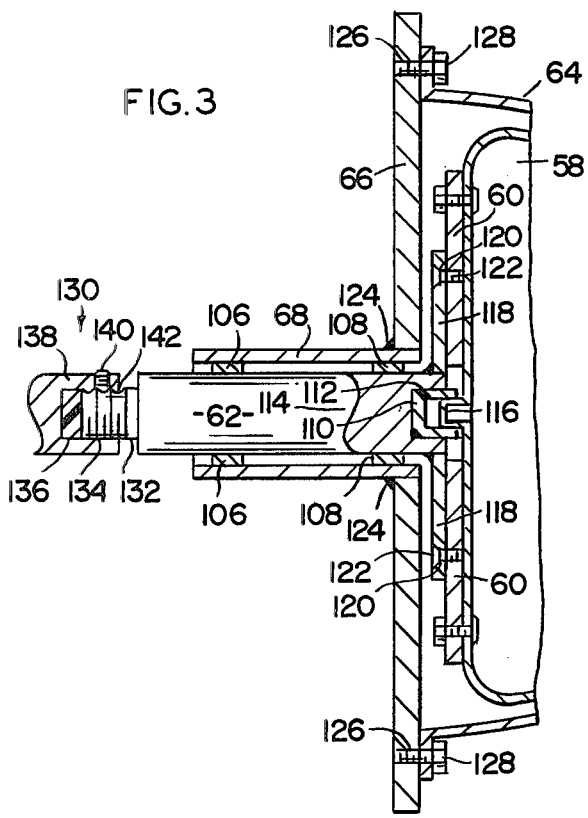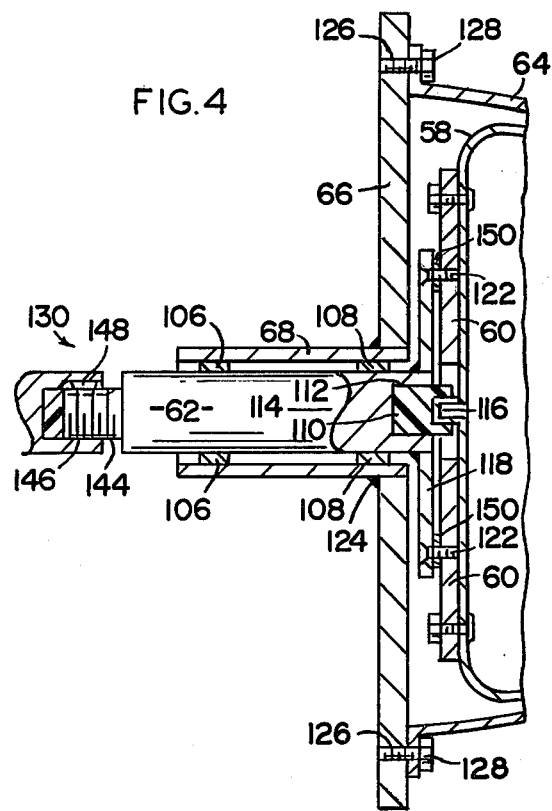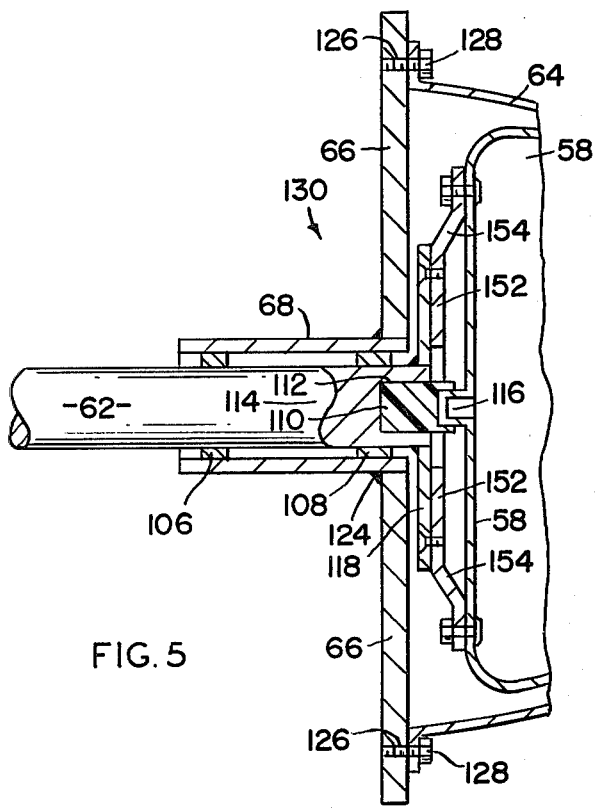

APPARATUS AND METHOD FOR TESTING TRANSMISSIONS

BACKGROUND OF THE INVENTION

1. Field of the Invention

This invention relates to an apparatus and method for testing automatic vehicular transmissions. More specifically, this invention relates to an apparatus which enables a large variety of transmissions to be installed therein and subjected to a test procedure designed to test substantially all of the individual components of the transmission.

2. Description of the Prior Art

Presently there exists a need in the automotive transmission repair industry to provide a means for fully and accurately testing a vehicular transmission to determine whether the transmission is operating in the manner in which the manufacturer thereof intended it to operate. Specifically, in the case of automotive transmissions, the state of the art method for repairing the transmission comprises removing the transmission from the vehicle and disassembling all of the components of the transmission in an attempt to locate the defective component. After the defective component is located and repaired, the transmission is then reassembled and installed into the vehicle. The vehicle is road tested to roughly determine whether the transmission operates according to manufacturer's specifications. It is apparent that disassembling the entire transmission to hopefully locate the defective component is laborious and consequently tremendously expensive to the owner of the vehicle. Moreover, whether the mechanic actually did repair all of the defective components cannot be determined until the transmission is reinstalled in the vehicle and road tested. If further repairs are needed, the transmission must again be removed from the vehicle and disassembled.

In order to reduce the possibility of having to twice remove, disassemble, repair and install the transmission in the vehicle, various transmission testers have been designed. For example, U.S. Pat. No. 2,918,822 discloses an apparatus for testing automatic transmissions having the torque converter or fluid coupling removed. Specifically, the apparatus comprises a drive motor which is splined to the turbine shaft, stator shaft and pump shaft of the transmission being tested. Each of the shafts are selectively rotated to hopefully test the components of the test transmission. Unfortunately, the apparatus is limited in the types of transmissions which may be tested. No provision is made for testing the transmission with the torque converter or fluid coupling installed nor is provision made for enabling a large variety of test transmissions to be easily installed in the apparatus without making substantial changes in the structure of the apparatus. Moreover, as the test transmission is subjected to the test procedure, the operator of the apparatus can only visually check the operation of the test transmission. No feature is provided to eliminate the subjectiveness of the test procedure. Accordingly, the results of the test procedure very heavily depends upon the competency of the operator, with standardization being almost impossible to achieve.

Therefore it is an object of this invention to provide an apparatus and method which overcomes the aforementioned inadequacies of the prior art devices and provides an improvement which is a significant contribution to the advancement of the transmission testing art.

Accordingly, it is an object of this invention to provide an apparatus and method for testing vehicular transmissions which include a means for automatically subjecting the transmission to a test procedure and automatically determining whether the results of the test procedure occurred within prescribed limits set by the manufacturer of the transmission.

Another object of this invention is to provide an apparatus and method for testing vehicular transmissions which includes a drive means which variably rotates the input of the transmission being tested.

Another object of this invention is to provide an apparatus and method for testing vehicular transmissions which enables a load means which selectively subjects the output of the transmission to varying amounts of torque during the test procedure.

Another object of this invention is to provide an apparatus and method for testing vehicular power transmissions which includes an input adjustment means and an output adjustment means which enable a large variety of transmissions to be installed into the apparatus.

Another object of this invention is to provide an apparatus and method for testing vehicular transmissions which includes a means for inverting the transmission to facilitate the repair of the transmission.

Another object of this invention is to provide an apparatus and method for testing vehicular transmissions which includes a brake mechanism which, when actuated, prevents the output of the transmission from rotating thereby facilitating the testing of the transmission in reverse gear.

Another object of this invention is to provide an apparatus and method for testing vehicular transmissions which includes a solenoid lock mechanism which prevents the housing of the transmission from rotating while the input of the test transmission is rotated.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment, in addition to the scope of the invention defined by the claims taken in conjunction with the accompanying drawings.

SUMMARY OF THE INVENTION

The invention is defined by the appended claims to cover the disclosed embodiments shown in the attached drawings and the equivalent thereof as set forth in the detailed discussion. For the purpose of summarizing the invention, the invention basically comprises an apparatus and method for testing automatic vehicular transmissions. Specifically, the transmission tester includes a base designed to receive the test transmission. A portable hoist supports the test transmission during the test procedure. A computer automatically subjects the test transmission to a test procedure and determines whether the test transmission upshifted and downshifted within prescribed limits set by the manufacturer of the test transmission. The results of the test procedure are then printed on a card for review by the operator and customer.

A variable speed drive means is provided for rotating the input of the test transmission and a load means is provided for loading the output of the test transmission during the test procedure. A pressure sensor is connected to the test transmission enabling the computer to monitor the fluid pressure of the test transmission during the test procedure. An input speed sensor and an output speed sensor are provided for monitoring the input and output speed, respectively, of the test transmission. A vacuum modulator control is provided for controlling the upshifting of the test transmission.

Another feature of the invention is an input adjustment means which enables a large variety of transmissions to be tested. Specifically, in each of the three embodiments, the input adjustment means can be adjusted to compensate for the relative distance between the torque converter and the converter housing of the test transmission. In a similar manner, an output adjustment means is provided for compensating for the distance between the output shaft of the test transmission and the load means. In the preferred embodiment of the output adjustment means, the load means is connected to a framework which is slideably disposed with respect to the base of the transmission tester. The load means may then be slid toward the test transmission to engage the output shaft thereof.

In the preferred embodiment, the load means comprises a load transmission having a variable picth torque converter installed therein. The variable pitch torque converter preferably comprises stator blades which are movable to a high or maximum angle position or a low or a minimal angle position by means of a stator solenoid. The parking lock pawl of the load transmission is preferably welded into the "park" position thereby precluding the output shaft of the load transmission from rotating.

The computer is preferably a microcomputer which comprises a microprocessor, read only memory, random access memory, clock, and various interface means, all of which are interconnected to a microcomputer bus. The interface means are connected to the various components of the transmission tester enabling the computer to selectively control the operation of each component. The pressure sensor, input speed sensor, and output speed sensor are also connected to the computer by means of the interface means.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a front perspective view of the invention showing the transmission being tested installed within the transmission tester;

FIG. 2 is a front view of FIG. 1 with the first and second housings removed;

FIG. 3 is a partial cross-sectional view of the first embodiment of the input adjustment means;

FIG. 4 is a partial cross-sectional view of the second embodiment of the input adjustment means;

FIG. 5 is a partial cross-sectional view of the third embodiment of the input adjustment means;

FIG. 6 is a partial top view of the invention showing the index means and the lock mechanism;

Similar reference characters refer to similar parts throughout the several views of the drawings.

DETAILED DESCRIPTION OF THE PREFERRED EMBODIMENT

Figure 7:
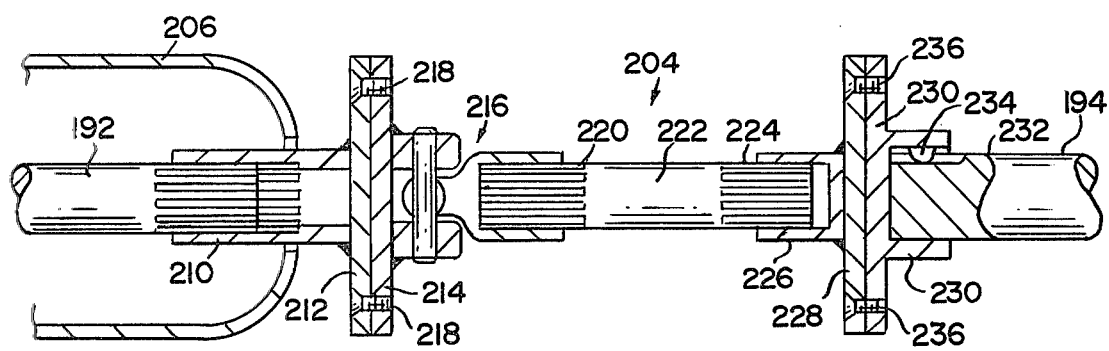
FIG. 7 is a partial cross-sectional view of the first embodiment of the output adjustment means showing the adaptor shaft interposed between the output shaft of the test transmission and the load shaft.

FIG. 1 is a perspective view of a transmission tester 10 designed to test automatic vehicular power transmissions 12. The transmission tester 10 basically comprises a base 14 which is adapted for supporting the test transmission 12. A drive means 16 for driving the input of the test transmission 12 is contained within a first housing 18. A load means 20 for loading the output of the test transmission 12 is contained within a second housing 22. A portable hoist 24 is provided for transferring the test transmission 12 from the storage facilities to the transmission tester 10 and for supporting the test transmission 12 during the test procedure. Specifically, portable hoist 24 comprises a horizontal member 26 disposed between two vertical members 28 and 30. Each of the vertical members 28 and 30 are then connected to a base member 32 having wheels 34 mounted thereto. The test transmission 12 is supported by the hoist 24 by means of a block and tackle 36 connected to a removable bracket 38 secured to the test transmission 12.

A computer 40 is provided for controlling the operation of the test procedure. The computer 40 is contained within a portable computer console 42. A keyboard terminal 46, display means 48, and card printer 50 are provided for enabling the operator of the transmission tester 10 to communicate with the computer 40. The computer 40 is connected to the various components of the transmission tester 10 by means of a multiconductor cable 52. A manual control panel 54 is provided to enable the operator to override computer 40 and selectively step the test transmission 12 through the test procedure.

FIG. 2 is a front view of FIG. 1 showing most of the components of the transmission tester 10. Specifically, the torque converter 58 of the test transmission 12 is connected to a flywheel 60 which is in turn connected to drive shaft 62. The transmission bell housing 64 of the test transmission 12 is connected to a turret plate 66 which is in turn, connected to a turret tube 68 in which the drive shaft 62 rotates. The drive shaft 62 is journalled within journal bearings 70 and 72 which are supported by supports 74 and 76, respectively. Similarly, turret tube 68 is journalled within journal bearings 78 and 80 which are supported by supports 82 and 84.

A drive means 16 is provided for driving drive shaft 62. Specifically, drive means 16 comprises an electric motor 86 having an output shaft 88 connected to a variable speed pulley arrangement 90. An endless or continuous belt member 92 interconnects the variable speed pulley arrangement 90 to a drive pulley 94 connected to the drive shaft 62. The variable speed pulley arrangement 90 comprises a first and a second side portion 96 and 98 sloped inwardly toward an apex point. An electric motor 100 is connected to the second side portion 98 for moving the second side portion 98 axially toward and away from the first side portion 96. For example, advancing motor 100 causes the relative distance between the first and second side portions 96 and 98 to decrease thereby increasing the effective diameter of the pulley arrangement 90 and causing the drive shaft 62 to rotate at a slower speed. Conversely, reversing motor 100 decreases the effective diameter of pulley arrangement 90 and causes the drive shaft 62 to rotate at a faster speed. It should be noted that the variable speed pulley arrangement 90 together with the electric motor 86 is only one specific embodiment of drive means 16. Accordingly, many other drive means 16 may be utilized without departing from the spirit and scope of this invention.

As shown in FIG. 3, the drive shaft 62 is rotatably disposed within turret tube 68 by means of bearings 106 and 108. A locator bushing 110 slideably engages into a bore 112 disposed in the distal end 114 of the drive shaft 62. The locator bushing 110 centers the hub 116 of the torque converter 58 of the test transmission 12 with the drive shaft 62. It is noted that various locator bushings 110 having different inner diameters may be utilized for accepting the hub 116 of the particular make and model of the transmission 12 being tested.

An adaptor plate 118 is welded to the distal end 114 of the drive shaft 62. A plurality of holes 120 are disposed within the adaptor plate 118 in a particular pattern enabling the flywheel 60 of the test transmission 12 to be rigidly connected thereto by means of threaded fasteners 122.

In a similar manner, the turret plate 66 is rigidly welded to the turret tube 68 by means of weld 124. A plurality of holes 126 are disposed in the turret plate 66 in a particular pattern enabling a large variety of transmission bell housings 64 made by different manufacturers to be connected thereto by means of threaded fasteners 128.

It is noted that the relative distance between the torque converter 58 and the end of the transmission bell housing 64 varies depending on the particular make and model of the test transmission 12. Accordingly, an input adjustment means 130 is provided for easily compensating for such differences. FIG. 3 is a cross-sectional view of the first embodiment of the input adjustment means 130. Specifically, the drive shaft 62 includes a minor shaft portion 132 having a diameter which is less than the diameter of the drive shaft 62. The minor shaft portion 132 slideably engages into a bore 134 disposed within another portion of the drive shaft 62. One or more shims 136 may be stacked within the sleeve 138 of the bore 134 to increase the relative length of drive shaft 62 thereby increasing the relative distance between the turret plate 66 and adaptor plate 118. A threaded fastener 140 such as a set screw is threadably disposed through sleeve 138 to engage one of a plurality of indentations 142 disposed in the minor shaft portion 132, with the relative distance between each of the indentations 142 corresponding to the thicknesses of shims 136.

FIG. 4 is a cross-sectional view of the second embodiment of the input adjusting means 130. Specifically, the drive shaft 62 includes a minor shaft portion 144 having a diameter which is less than the diameter of the drive shaft 62. The minor shaft portion 144 slideably engages into a bore 146 disposed within another portion of the drive shaft 62. A woodruff key 148 or the like is disposed between the minor shaft portion 144 and the bore 146 thereby preventing the minor shaft portion 144 from rotating with respect to bore 146 but enabling the minor shaft portion 144 to slideably engage bore 146 in an axial direction. One or more shims 150 are interposed on threaded fasteners 122 between the adaptor plate 118 and the flywheel 60. Various shims 150 having different thicknesses may be selected depending on the relative distance between the end of transmission bell housing 64 and torque converter 58 thereby enabling a variety of test transmissions 12 to be installed in the transmission tester 10.

FIG. 5 is a cross-sectional view of the third and the preferred embodiment of the input adjustment means 130. Specifically, various adaptor flywheels 152 are provided having an annular bend 154 disposed therein which increases the effective distance between the adaptor plate 118 and the torque converter 58. Accordingly, the selection of an adaptor flywheel 152 having an appropriate annular bend 154 compensates for the relative distance between the end of the transmission bell housing 64 and the torque converter 58.

As shown in FIGS. 4 and 5, when utilizing the second and third embodiment of the input adjustment means 130, the length of the locator bushing 110 mentioned previously must be increased in order that the hub 116 of the torque converter 58 may be seated therein.

As shown in FIG. 6, an index means 156 is provided for rotating the turret tube 68 and correspondingly, the turret plate 66. The index means 156 comprises an electric motor 158 rigidly connected to supports 76 and 82 by means of brackets 160 and 162. The forward output shaft 164 is connected to a first sprocket 166. A second sprocket 168 is rigidly connected to the turret tube 68 between supports 82 and 84. An endless or continuous chain 170 interconnects the sprockets 166 and 168. A brake mechanism 172 is connected to the rearward output shaft 174 and is rigidly secured to the motor 158 by means of threaded fasteners 176. During the installation of a test transmission 12, the index means 156 is operated to index the turret plate 66 to a particular orientation to align the holes 126 therein with the mounting holes in the transmission bell housing 64. The index means 156 may also be utilized to rotate the turret plate 66 thereby inverting the test transmission 12. The bottom of the test transmission 12 will therefore be exposed to facilitate repairing of the test transmission 12.

A lock mechanism 178 is provided for preventing the turret plate 66 from rotating during the test procedure. The lock mechanism 178 comprises an electric solenoid 180 connected to support 82 by means of sprocket 182. The inner core 184 of the solenoid 180 is connected to a shaft 186 slideably disposed within support 188. Upon actuation of the solenoid 180, the inner core 184 and shaft 186 move to an extended position to engage an orifice 190 disposed in turret plate 66, thereby preventing the turret plate 66 from rotating. It is noted that lock mechanism 178 may alternatively comprise a rod (not shown) which is manually inserted through a hole in support 84 to engage the orifice 190.

Referring again to FIG. 2, the output shaft 192 of the test transmission 12 is connected to a load shaft 194 which is in turn connected to a load means 20. The load shaft 194 is journalled within journal bearings 196 and 198 which are in turn supported by supports 200 and 202, respectively.

It is noted that the relative distance between the output shaft 192 of the test transmission 12 and the proximal end of the load shaft 194 varies depending on the length of the particular make and model of the transmission 12 being tested. Accordingly, an output adjustment means 204 is provided for easily compensating for such differences. FIG. 7 is a cross-sectional view of FIG. 2 along lines 7—7 showing the first embodiment of the output adjustment means 204. Specifically, the output shaft 192 disposed within the end 206 of the transmission housing 208 is connected to a splined adaptor coupling 210 having a plate 212 welded thereto. Another plate 214 is welded to a universal joint 216 and is connected to the first plate 212 by means of threaded fasteners 218. The proximal end 220 of a splined spacer shaft 222 is connected to the universal joint 216. The distal end 224 of the splined spacer shaft 222 is then connected to a splined adaptor coupling 226 having a plate 228 welded thereto. A collar 230 is connected to the proximal end 232 of the load shaft 194 by means of a woodruff key 234 or the like. A plurality of threaded fasteners 236 rigidly secures the plate 228 of the splined adaptor coupling 226 to the collar 230. As can be readily seen, selection of a splined spacer shaft 222 having an appropriate length and the installation thereof into the universal joint 216 and the splined adaptor coupling easily compensates for the relative distance between the output shaft 192 of the test transmission 12 and the load shaft 194.

Figure 8:
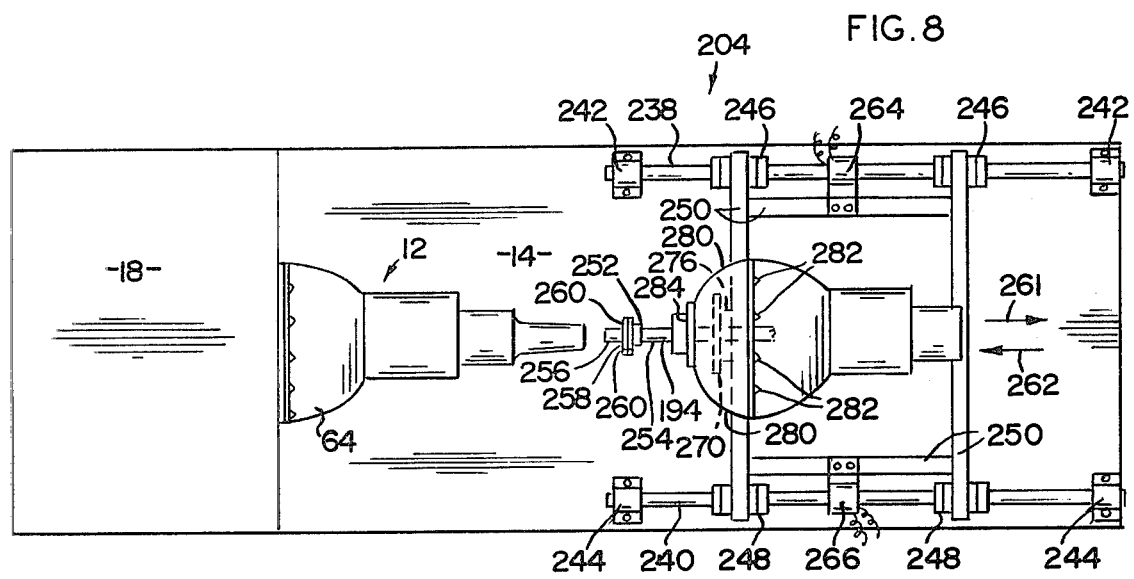
FIG. 8 is a top view of the invention having the second embodiment of the output adjustment means incorporated therein.

FIG. 8 is a top view of the second embodiment of the output adjustment means 204. Specifically, output adjustment means 204 comprises a pair of roller shafts 238 and 240 disposed on each side of base 14 by means of brackets 242 and 244, respectively. A pair of ball pillow blocks 246 and 248 is then slideably disposed about each of the roller shafts 238 and 240, respectively. A substantially rectangular framework 250 interconnects each of the four pillow blocks 246 and 248. The load means 20 is then rigidly connected to the framework 250. A collar 252 is connected to the proximal end 254 of the load shaft 194. A splined adaptor coupling 256 having a plate 258 welded thereto is then connected to collar 252 by means of threaded fasteners 260. In operation, the load means 20 is slid rearwardly as shown by arrow 261 enabling the test transmission 12 to be installed. The load means 20 is then slid forwardly as shown by arrow 262 until the splined adaptor coupling 256 engages the output shaft 192 of the test transmission 12. The framework 250 and correspondingly, the load means 20, are locked into position by means of locking devices 264 and 266 connected to framework 250 which lock onto roller shafts 238 and 240, respectively. It is noted that a universal joint (not shown) may be interposed between the output shaft 192 of the test transmission and the load shaft 194.

A brake mechanism 268 is provided for braking the load shaft 194 during selected intervals of the test procedure. Specifically, brake mechanism 268 comprises a disc 270 rigidly secured to the load shaft 194. A pair of brake calipers 272 and 274 are connected to a caliper mechanism 276 and disposed about the disc 270 located therebetween. The brake mechanism 268 thus described is a disc brake assembly commonly found in the art. In the preferred embodiment of the invention, a conduit 271 is connected to the main line pressure take-off point 273 of the test transmission 12. An electrically operated valve 275 is connected to conduit 271 and to a second conduit 277 which is connected to the caliper mechanism 276. Finally, a third conduit 279 interconnects valve 25 with a fluid reservoir 366 discussed later in greater detail. Upon actuation of valve 275, the fluid pressure is supplied through conduit 277 to actuate the caliper mechanism 276 of the brake mechanism 268 thereby braking the load shaft 194. Upon deactuation of valve 275, fluid pressure contained within the second conduit 277 is vented via third conduit 279. It should be noted that other brake assemblies such as a drum brake assembly or an air brake assembly may be utilized without departing from the spirit and scope of this invention.

As shown in FIG. 2, the caliper mechanism 276 of the brake mechanism 268 is rigidly secured to a support 278 connected to the base 14 of the transmission tester 10. When utilizing the second embodiment of the output adjustment means 204 shown in FIG. 8, the brake mechanism 268 is secured to framework 250. Specifically, the disc 270 is rigidly secured to load shaft 194 with the caliper mechanism 276 being secured to framework 250. A bell housing cover 280 is connected to load means 20 by threaded fasteners 282. A bearing 284 is disposed within cover 280 enabling load shaft 194 to rotatably extend from cover 280 to the test transmission 12.

As noted earlier, the load means 20 is connected to the load shaft 194 to load the output of the test transmission 12 during the test procedure. An alignment means 286 is provided which enables the operator, when installing the test transmission 12 in the transmission tester 10, to axially align the load means 20 and load shaft 194 with the output shaft 192 of the test transmission 12. More specifically, the adjustment means 286 comprises a pair of diagonal support members 288 welded to the upper portion of the base 14 which are connected to each side of the load means 20 by means of threaded fasteners 290. A horizontal support member 292 is welded to the upper portion of the base 14 and extends substantially parallel to the axis of the load means 20. A vertically disposed threaded stock 294 is connected to support member 292 and extends therefrom to a bracket 296 connected to the rearward end of the load means 20. Finally, a pair of threaded stock 298 are connected to the upper portion of the base 14 and are disposed through holes in mounting ears 302 on each side of load means 20. A pair of nuts 304 and 308 are threadably disposed on each side of each mounting ear 302. Accordingly, the axis of the load means 20 is easily adjusted to be colinear with the axis of load shaft 194 by adjusting the threaded stocks 294 and 298. It is noted that the alignment means 286 may be utilized with the second embodiment of the output adjustment means 204 by connecting threaded stocks 294 and 298, and support members 288 and 292 to framework 250.

Figure 9:
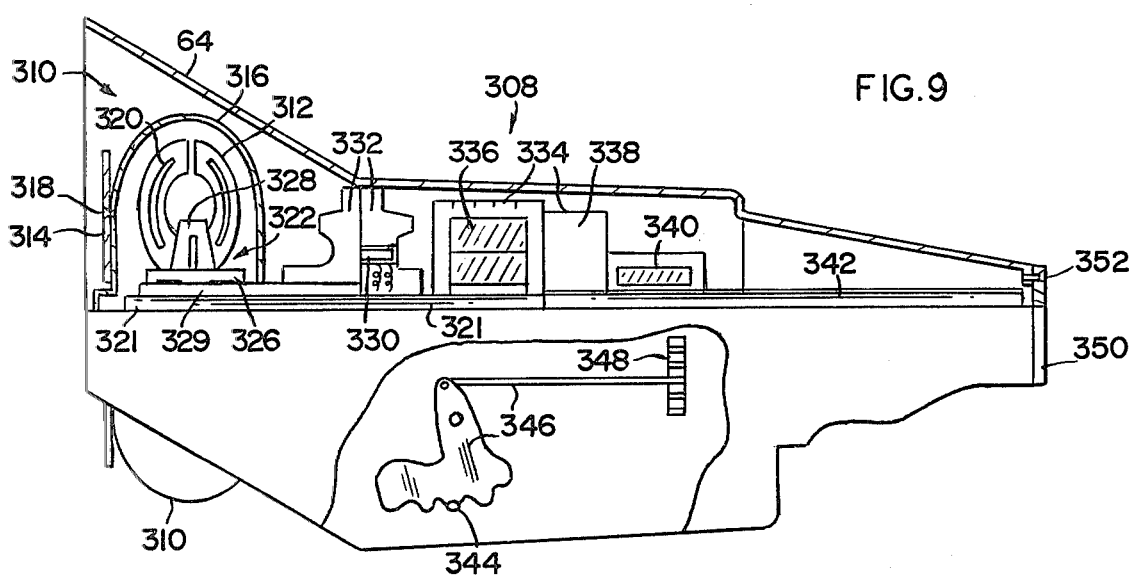
FIG. 9 is a partial cross-sectional view of the load means which comprises a load transmission.

FIG. 9 is a partial cross-sectional view of the preferred embodiment of load means 20. Specifically, the load means 20 comprises an automatic vehicular transmission 308 having a variable pitch torque converter 310. Preferably, the transmission 308 acting as the load means 20 is the automatic transmission 308 which was manufactured by General Motors, Incorporated, Dearborne, Michigan during 1964-1967 and was commonly referred to as "Buick Super Turbine 300 VP". Basically, the variable pitch torque converter 310 comprises a converter pump or impeller 312. An adaptor plate 314 is rigidly welded to the distal end of load shaft 194 and is rigidly connected to the casing 316 of impeller 312 by means of threaded fasteners 318. A turbine 320 is connected to the mainshaft 321 of the load transmission 308. A stator assembly 322 is then connected to a stator shaft 324 by means of a stator roller clutch 324. As noted earlier, stator assembly 322 is preferably a variable pitch unit in which the stator blades 328 are operated between a maximum or high angle, or a minimum or low angle by means of a stator solenoid 330.

During normal operation, fluid from pump assembly 332 is supplied to impeller 312. As the load shaft 194 and correspondingly, the impeller 312 rotate, the fluid within the torque converter 310 is set into motion and directed to the turbine 320, causing the turbine 320 to also rotate. As the fluid passes through the turbine 320, it is redirected by the stator blades 328 to the impeller 312. Actuation of the stator solenoid 300 supplies fluid to the stator blades 328 thereby changing the pitch of the stator blades 328 from a maximum or high angle position to a minimum or low angle position. As the speed of the turbine 320 increases, the direction of the fluid leaving the turbine 320 changes and flows against the rear side of the stator blades 328 in a clockwise direction. Since the stator blades 328 are now impeding the smooth flow of fluid, the stator roller clutch 326 releases and revolves freely on the stator shaft 324. Once the stator assembly 322 becomes inactive, there is no further multiplication of torque within the torque converter 310, and the torque converter 310 is merely acting as a fluid coupling device.

The load transmission 308 further comprises planetary gear set 334, forward clutch 336, low band 338, reverse clutch 340, and output shaft 342. A range selector 344 being operable among park, reverse, neutral, and drive positions is connected to a parking pawl actuator 346 which is in turn connected to the parking lock pawl 348. In the preferred embodiment of the invention, the parking lock pawl 348 is welded into the "park" position. The output shaft 342 on the load transmission 308 is therefore prevented from rotating. The range selector 344 is still operable to shift the load transmission 308 into the various ranges.

It is noted that the output shaft 342 is cut off within the load transmission 308 and a cover plate 350 is connected thereto by means of threaded fasteners 352. It is also noted that a great amount of heat builds up within the load transmission 308 because of the output shaft 342 being permanently locked into the "park" position. As shown in FIG. 2, a heat exchanger 354 is connected to the load transmission 308. A pump 356 forces transmission fluid through the load transmission 308 by means of conduits 358. A fan 360 connected to a motor 362 circulates air through the finned coils 364 of the heat exchanger 354 to cool the transmission fluid.

The transmission tester 10 further comprises a transmission fluid reservoir 366. After the test transmission 12 is installed in the transmission tester 10, the transmission fluid contained within reservoir 366 is pumped by pump means 368 through conduits 370 to fill the test transmission 12 with fluid. After the test procedure is completed, the fluid is removed from the test transmission 12 and returned through conduits 370 to reservoir 366.

Figure 10:
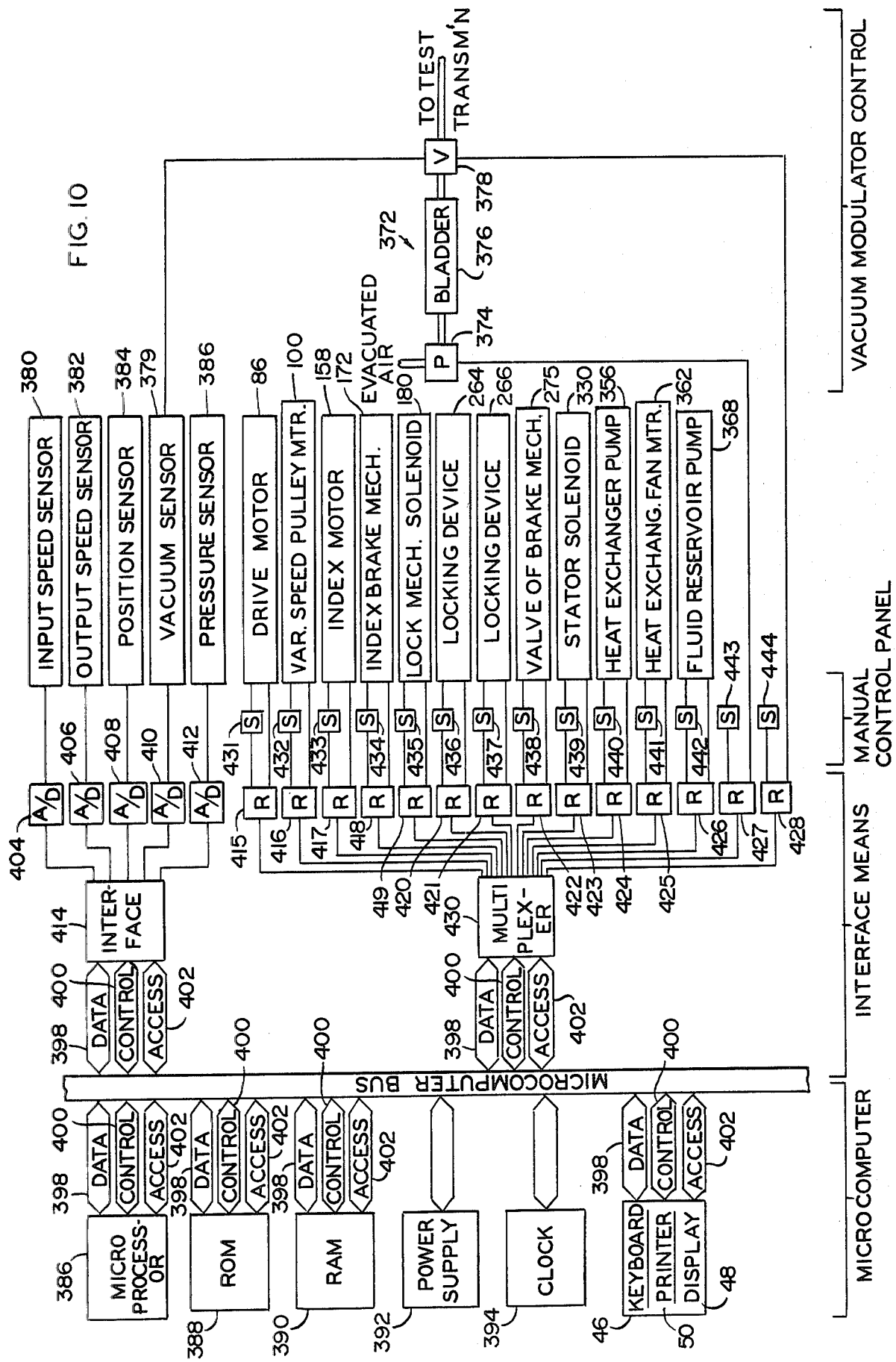
FIG. 10 is a block diagram of the microcomputer and the interconnections thereof to the various components of the transmission tester.

A vacuum modulator control 372 is connected to the vacuum modulator of the test transmission 12 to control the up-shifting of the test transmission. More particularly, as shown in FIG. 10, control unit 372 comprises a vacuum pump 374 connected to a vacuum bladder 376. The vacuum present in bladder 376 is supplied to the vacuum modulator of the test transmission 12. A valve means 378 is provided for regulating the amount of vacuum supplied to the vacuum modulator thereby controlling the up-shifting of the test transmission 12. A vacuum sensor 379 may be provided for sensing the amount of vacuum supplied to the vacuum modulator.

An input speed sensor 380 is connected to support 74 to engage drive shaft 62 (see FIG. 2). In a similar manner, an output speed sensor 382 is connected to support 200 or to framework 250 to engage load shaft 194. The speed sensors 380 and 382 sense the speed of the drive shaft 62 and the load shaft 194, respectively.

A position sensor 384 is connected to support 84 to engage turret plate 66 (see FIG. 6). The position sensor 384 senses the rotational position of the turret plate 66 enabling the turret plate 66 to be rotated by index means 156 to a particular orientation thereby allowing the converter housing 64 of the test transmission 12 to be mounted thereto.

A pressure sensor 385 is provided for sensing the pressure of the transmission fluid contained within the test transmission 12 during the test procedure. The pressure sensor 386 is preferably connected to the main line pressure take-off point 273 of the test transmission 12.

FIG. 10 is a block diagram of the various components of computer 40 and the interconnections thereof to the transmission tester 10. Specifically, computer 40 comprises a microprocessor 386 for implementing the various steps of the test procedure, read only memory (ROM) 388 for storing the initialization and permanent programs, random access memory (RAM) 390 for storing volatile programs and data, power supply 392 for providing power to the various components, and clock 394 for providing synchronization. The microprocessor 386, ROM 388, and RAM 390 are connected to a microcomputer bus 396 by data 398, control 400, and access 402 interconnections. The power supply 392 and clock 394 are also connected to the microcomputer bus 396. The keyboard 46, display means 48, and card printer 50 are also connected to the microcomputer bus 396 by the data 398, control 400, and access 402 interconnections.

As shown in FIG. 10, the input speed sensor 380, the output speed sensor 382, position sensor 384, vacuum sensor 379, and pressure sensor 386 are each connected to an analog-to-digital converter 404, 406, 408, 410, and 412 for converting the analog signal to a digital signal. Each of the A/D converters 404, 406, 408, 410, and 412 are then connected to interface means 414 which is in turn connected to the microcomputer bus 396 by means of the data 398, control 400, and access 402 interconnections. The computer 40 likewise controls the operation of the various components of the transmission tester 10. Specifically, the drive motor 86, variable speed pulley motor 100, index motor 158, index brake mechanism 172, lock mechanism solenoid 180, locking devices 264 and 266, valve 275 of the output brake mechanism 268, stator solenoid 330, heat exchanger pump 356, heat exchanger fan motor 362, transmission fluid reservoir pump 368, and the pump 374 and valve 378 of the vacuum modulator control unit 372 are each connected to a relay means 415-428, respectively, which are in turn, connected to multiplexor 430. The multiplexor 430 is then connected to the microcomputer bus 396 by means of data 398, control 400, and axis 402 interconnections. The microprocessor 386 of computer 40 is therefore able to selectively control the sequence of the test procedure while monitoring the rotational position of the turret plate 66, input speed, output speed, hydraulic pressure, and the vacuum being applied to the test transmission 12. It is noted that a plurality of switches 431-444 are connected to the relay means 415-428, respectively, enabling the operator of the transmission tester 10 to selectively control the sequence of the test procedure.

It is apparent that the above described transmission tester 10 is designed to automatically test vehicular power transmissions 12. The test procedure can be summarized as follows. The operator of the transmission tester 10 types in the particular make and model of the test transmission 12 to the computer 40 via keyboard 46. The computer 40 controls the operation of the index means 156 which rotates the turret plate 66 to a particular orientation enabling the transmission bell housing 64 of the test transmission 12 to be connected thereto. The input adjustment means 130 and the output adjustment means 204 are then adjusted to accommodate that particular transmission 12 being tested thereby enabling the test transmission 12 to be installed in the transmission tester 10. The test transmission 12 is transported by hoist 24 to the transmission tester 10 and installed therein. The vacuum modulator control 372, pressure sensor 385, and conduits 370 of the transmission fluid reservoir 366 are then connected to the vacuum modulator, the mainline pressure take-off point 273, and the fluid input of the test transmission 10, respectively.

At this point, the computer 40 automatically controls the sequence of the test procedure. The computer 40 fills the test transmission 12 with transmission fluid by controlling the pump 368 of fluid reservoir 366. The computer 40 then actuates drive means 16 which rotates the drive shaft 62. As the speed of the drive shaft 62 increases by operation of the variable speed pulley arrangement 90, the transmission fluid pressure contained within the test transmission 12 increases. Simultaneously, the computer 40 controls the vacuum modulator control 372 to increase the amount of vacuum supplied to the vacuum modulator of the test transmission 12. After the vacumm being supplied to the vacuum modulator is increased to a certain point, the test transmission 12 upshifts into second gear. The fluid pressure of the test transmission 12 momentarily drops. Correspondingly, the computer 40 senses such a drop in pressure via pressure sensor 385 and simultaneously drops the amount of vacuum being supplied to the vacuum modulator. The microprocessor 386 of computer 40 accesses the data relating to the particular transmission 12 being tested and compares such data with the input speed and fluid pressure of the test transmission 12. The results of this particular portion of the test procedure is then printed on a computer card which has been inserted into the card printer 50.

The next portion of the test procedure includes further increasing the input speed of the test transmission 12 and again increasing the vacuum being supplied thereto. As the input speed increases, the fluid pressure correspondingly increases along with the vacuum being supplied to the test transmission 12. When the amount of vacuum being supplied increases to a predetermined amount, the test transmission 12 upshifts to third gear. A momentary drop in the transmission fluid pressure is sensed by the computer 40 via pressure sensor 385 and the computer 40 then immediately drops the amount of vacuum being supplied to the test transmission 12. The computer 40 compares the input speed and the fluid pressure of the test transmission 12 with the prescribed limits set by the manufacturer of the test transmission and prints the results on the computer card by means of card printer 50.

As noted earlier, the pitch of the stator blades 328 of the torque converter 310 of the load transmission 308 is controlled by the stator solenoid 330 which is in turn, controlled by computer 40. Accordingly, the amount of torque placed on the load shaft 194 can be controlled either by actuation of the stator solenoid 330 or by manually shifting the range selector 344 into the park, neutral or drive positions. Specifically, while the test transmission 12 is in first gear, the stator blades 328 are actuated by computer 40 to their high or maximum angle position and the range selector 344 is shifted to the drive position. After the test transmission 12 shifts from first to second, the stator blades 328 remain in their high or maximum angle position with the range selector 344 remaining in the drive position. Alternatively, the range selector 344 may be manually shifted to the neutral position or the stator blades 328 may be actuated by computer 40 to their low or minimum angle position. Finally, after the test transmission 12 shifts from second to third, the stator blades 328 may be actuated to their low or minimum angle position with the range selector 344 remaining in either the drive, park or neutral position.

The downshifting of the test transmission 12 may be tested to determine if each downshift occurred within the prescribed limits set by the manufacturer. Specifically, as the input speed of the test transmission 12 slowly decreases, the test transmission 12 shifts from third to second. The momentary surge in fluid pressure is then detected by the pressure sensor 385. The computer 40 determines whether such downshifting occurred within the limits prescribed by the manufacturer and prints the same on the card by means of the card printer 50. The same procedure is then repeated as the input speed further decreases causing the test transmission 12 to shift from second to first gears. After the test transmission 12 has shifted to first gear, the brake mechanism 268 may then be actuated by computer 40 to bring the output of the test transmission 12 to a complete stop. During such downshifting, the stator blades 328 are preferably in the low or minimum angle position and the range selector 344 is in neutral.

The reverse gear of the test transmission 12 is checked by actuating the brake mechanism 268 and then increasing the input speed while monitoring the transmission fluid pressure. The computer 40 compares the fluid pressure with the limits set by the manufacturer and determines whether such pressure is within those limits and prints the same on the card by means of the card printer 50.

It is noted that the rapid downshifting of the test transmission 12 can also be tested. Specifically, with the test transmission 12 running in third gear, the stator solenoid 330 can be actuated by computer 40 to shift the stator blades 328 to their high or maximum angle position thereby placing a high amount of torque on the output shaft 192 of the test transmission 12 and causing the test transmission 12 to rapidly downshift from third to second. The brake mechanism 268 may then be actuated to cause the test transmission to rapidly downshift from second to first. The fluid pressure and input speed is monitored by computer 40 to determine whether the pressure surges occurred at the proper input speed as prescribed by the manufacturer.

It should be appreciated that the transmission tester 10 can effectively test all of the components of the test transmission 12 by selectively stepping the test transmission 12 through the test procedure. If the test transmission 12 fails any of the steps, the computer 40 indicates such failure to the operator via display means 48. Through the use of the manual control panel 54, the operator can then repeat the step of the test procedure which the test transmission 12 originally failed. If repairs or adjustments are necessary, the test transmission 12 can then be inverted by operation of the index means 156.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:

What is claimed is:

1. An apparatus for testing automatic vehicular power transmissions, comprising in combination:
    a base;
    a drive shaft rotatably disposed relative to said base;
    drive means connected to said drive shaft for rotating said drive shaft;
    an adaptor plate rigidly connected to said drive shaft;
    means for connecting the torque converter of the test transmission relative to said adaptor plate;
    a turret tube disposed relative to said base;
    said drive shaft being rotatably disposed within said turret tube;
    a turret plate rigidly connected to the distal end of said turret tube;
    means for connecting the transmission bell housing of the test transmission relative to said turret plate;
    a load shaft rotatably disposed relative to said base;
    means for connecting said load shaft to the output shaft of the test transmission; and
    load means for imparting a loading torque on said load shaft thereby loading the output shaft of the test transmission.

2. The apparatus as set forth in claim 1, wherein said drive means comprises in combination:
    an electric motor means;
    a variable speed pulley arrangement connected to the output shaft of said electric motor means;
    means for interconnecting said variable speed pulley arrangement and said drive shaft.

3. The apparatus as set forth in claim 2, wherein said means for interconnecting said variable speed pulley arrangement and said drive shaft comprises an endless chain means.

4. The apparatus as set forth in claim 1, wherein said means for connecting the torque converter of the test transmission relative to said adaptor plate comprises in combination:
    a flywheel connected to the torque converter of the test transmission;
    a plurality of holes disposed within said adaptor plate in alignment with a plurality of mounting holes disposed in said flywheel; and
    a plurality of threaded fastener means disposed within said holes for connecting said flywheel to said adaptor plate.

5. The apparatus as set forth in claim 1, wherein said means for connecting the transmission bell housing of the test transmission relative to said turret plate comprises in combination:
    a plurality of holes disposed within said turret plate in alignment with a plurality of mounting holes disposed within the transmission bell housing; and
    a plurality of threaded fastener means disposed within said holes for connecting the transmission bell housing to said turret plate.

6. The apparatus as set forth in claim 1, including means for concentrically locating the hub of the torque converter of the test transmission with said drive shaft.

7. The apparatus as set forth in claim 6, wherein said means for concentrically locating the hub of the torque converter of the test transmission with said drive shaft comprises a locator bushing disposed within the distal end of said drive shaft and having an inner diameter substantially equal to the diameter of the hub of the torque converter of the test transmission.

8. The apparatus as set forth in claim 1, wherein said load means comprises in combination:
    a load transmission;
    said load transmission including a torque converter connected relative to an input shaft of said load transmission; and
    means for connecting said torque converter relative to said load shaft.

9. The apparatus as set forth in claim 8, wherein said torque converter is a variable pitch torque converter.

10. The apparatus as set forth in claim 9, wherein said variable pitch torque converter comprises in combination:
    a turbine connected relative to said input shaft of said load transmission;
    an impeller connected relative to said load shaft;
    a stator assembly having stator blades operable between a low or minimum angle position and a high or maximum angle position;
    said stator assembly being connected relative to a stator roller clutch;
    said stator roller clutch being connected to said input shaft of said test transmission; and
    a stator solenoid means for controlling the operation of said stator blades enabling said stator blades to change from said low or minimum angle position to said high or maximum angle position and visa versa.

11. The apparatus as set forth in claim 8, wherein the output shaft of said load transmission is prevented from rotating when said input shaft of said load transmission is rotated.

12. The apparatus as set forth in claim 1, including an index means for rotating said turret plate relative to said base.

13. The apparatus as set forth in claim 12, wherein said index means comprises in combination:
   an electric motor means connected relative to said base;
   a first sprocket means connected to the output shaft of said electric motor means;
   a second sprocket means connected to said turret tube;
   an endless chain means interconnecting said first sprocket and said second sprocket; and
   means for braking said turret plate.

14. The apparatus as set forth in claim 1, further including a lock mechanism which prevents said turret plate from rotating relative to said base.

15. The apparatus as set forth in claim 14, wherein said lock mechanism comprises in combination:
   a solenoid means connected relative to said base;
   said solenoid means including an inner core movable between an extended position and a retracted position;
   a shaft connected to said core;
   an orifice disposed within said turret plate and aligned with said shaft enabling said shaft to engage said orifice when said shaft is in an extended position.

16. The apparatus as set forth in claim 1, further including a brake mechanism for braking said load shaft.

17. The apparatus as set forth in claim 16, wherein said brake mechanism comprises in combination:
   a disc rigidly secured to said load shaft;
   a caliper mechanism having a pair of brake calipers;
   said brake calipers being disposed about said disc; and
   means for actuating said caliper mechanism causing said brake calipers to grasp said disc thereby braking said load shaft.

18. The apparatus as set forth in claim 17, wherein said means for actuating said caliper mechanism, comprises in combination:
   a first conduit connected to the mainline pressure take-off point of the test transmission;
   a second conduit connected to said caliper mechanism;
   a third conduit connected to a fluid reservoir; and
   a valve means interconnecting said first, second, and third conduits enabling fluid pressure from the test transmission to flow to said caliper mechanism when said valve means is actuated.

19. The apparatus as set forth in claim 1, further including an input adjustment means enabling various makes and models of test transmissions to be installed relative to said base.

20. The apparatus as set forth in claim 19, wherein said input adjustment means comprises:
   a locator bushing disposed within the distal end of said drive shaft;
   said locator bushing having an inner diameter substantially equal to the diameter of the hub of the torque converter of the test transmission and a longitudinal length enabling the hub to engage said inner diameter; and
   said means for connecting the torque converter of the test transmission relative to said adaptor plate including a flywheel having an annular bend disposed therein.

21. The apparatus as set forth in claim 19, wherein said input adjustment means comprises in combination:
   said drive shaft including a minor shaft portion having a diameter less than the diameter of said drive shaft;
   a bore disposed within another portion of said drive shaft and aligned with said minor shaft portion enabling said minor shaft portion to slideably engage said bore;
   a shim disposed within said bore to increase the relative length of said drive shaft;
   a plurality of indentations disposed in said minor shaft portion; and
   a threaded fastener threadably disposed through said second side portion into said bore to engage one of said indentations.

22. The apparatus as set forth in claim 19, wherein said input adjustment means comprises in combination:
   said drive shaft including a minor shaft portion having a diameter which is less than the diameter of said drive shaft;
   a bore disposed within a second portion of said drive shaft enabling said minor shaft portion to engage into said bore;
   means for preventing said minor shaft portion from rotating with respect to said bore; and
   a shim interposed on said means for connecting the torque converter of the test transmission relative to said adaptor plate.

23. The apparatus as set forth in claim 1, further including an output adjustment means enabling various makes and models of test transmissions to be installed relative to said base.

24. The apparatus as set forth in claim 23, wherein said output adjustment means comprises in combination:
   a splined spacer shaft interposed between the terminal end of the output shaft of the test transmission and said load shaft;
   means for connecting the proximal end of said splined spacer shaft relative to the terminal end of the output shaft of the test transmission; and
   means for connecting said splined spacer shaft relative to the proximal end of said load shaft.

25. The apparatus as set forth in claim 24, wherein said control means comprises a microcomputer.

26. The apparatus as set forth in claim 25, wherein said microcomputer comprises in combination:
   a microprocessor;
   a volatile memory means;
   a nonvolatile memory means;
   a clock means for providing synchronization to said microprocessor;
   a terminal means enabling data to be entered into and received from said microcomputer;
   an analog-to-digital converter connected to said input speed sensor, said output speed sensor, and said pressure sensor for converting the analog signal received therefrom to a digital signal;
   a first interface means connected to said analog-to-digital converter for interfacing said analog-to-digital converter to said microcomputer;
   a multiplexor-demultiplexor interface means connected to said drive means, said load means, and said vacuum modulator control enabling said microcomputer to control the operation thereof;

a microcomputer bus interconnecting said microprocessor, said memory means, said clock, said terminal, said first interface means, and said multiplexor-demultiplexor interface means.

27. The apparatus as set forth in claim 23, wherein said output adjustment means comprises in combination:
a roller shaft disposed on each side of said base; and
means for connecting said load means to slideably engage said roller shafts.

28. The apparatus as set forth in claim 27, wherein said means for connecting said load means to slideably engage said roller shafts, comprises in combination:
a ball pillow block rotatably disposed about each said roller shaft;
a framework rigidly connected to said ball pillow blocks; and
means for connecting said load means to said framework.

29. The apparatus as set forth in claim 1, further comprising in combination:
an input speed sensor;
means for connecting said input speed sensor to said drive shaft enabling said input speed sensor to sense the rotational speed of said drive shaft;
an output speed sensor;
means for connecting said output speed sensor to said load shaft enabling said output speed sensor to sense the rotational speed of said load shaft;
a pressure sensor;
means for connecting said pressure sensor to the mainline pressure take-off point of the test transmission enabling said pressure sensor to sense the pressure of the transmission fluid contained within the test transmission;
a vacuum modulator control;
means for connecting said vacuum modulator control to the vacuum modulator of the test transmission enabling said vacuum modulator control to control the upshifting of the test transmission;
control means;
means for connecting said control means to said input speed sensor, said output speed sensor, and said pressure sensor enabling said control unit to receive data therefrom; and
means for connecting said control means to said drive means, said load means, and said vacuum modulator control for controlling the operation thereof.

30. A method for testing automatic vehicular power transmissions, comprising the steps of:
adjusting an input adjustment means enabling various makes and models of transmissions to be installed relative to the base of a testing apparatus;
connecting a flywheel to the torque converter of the test transmission;
connecting the flywheel to a drive shaft;
connecting the transmission bell housing of the test transmission to a turret plate;
adjusting an output adjustment means enabling the output shaft of the test transmission to be connected to a load shaft;
connecting the output shaft of the test transmission to the load shaft;
rotating the drive shaft;
loading the load shaft while the drive shaft is being rotated;
supplying vacuum to the test transmission for upshifting the transmission;
determining when the test transmission shifts; and
determining whether the test transmission shifted within prescribed limits set by the manufacturer of the test transmission.

31. The method as set forth in claim 30, wherein the step of adjusting an input adjustment means comprises the step of selecting a flywheel having an annular bend disposed therein for increasing the relative distance between the torque converter of the test transmission and the end of the transmission bell housing of the test transmission.

32. The method as set forth in claim 30, wherein the step of adjusting an input adjustment means comprises the step of increasing the overall length of the drive shaft to compensate for the relative distance between the torque converter of the test transmission and the end of the transmission bell housing of the test transmission.

33. The method as set forth in claim 30, wherein the step of adjusting the output adjustment means comprises the step of interposing an adaptor shaft between the output shaft of the test transmission and the load shaft.

34. The method as set forth in claim 30, wherein the step of adjusting the output adjustment means comprises the step of sliding the means for loading the load shaft toward the output of the test transmission whereby the load shaft engages the output shaft of the test transmission.

35. The method as set forth in claim 30, wherein the step of loading the load shaft comprises the step of connecting a load transmission having a variable pitch torque converter installed therein to the load shaft.

36. The method as set forth in claim 35, further comprising the step of controlling the actuation of the stator solenoid of the variable pitch torque converter thereby controlling the amount of torque applied to the load shaft.

37. The method as set forth in claim 30, wherein the step of supplying vacuum to the test transmission, comprises the steps of:
increasing the amount of vacuum supplied to the test transmission in proportion to the increased input speed of the test transmission until the test transmission upshifts; and
immediately reducing the amount of vacuum supplied to the test transmission when the test transmission has upshifted.

38. The method as set forth in claim 30, wherein the step of determining when the test transmission shifts, comprises the steps of:
connecting a pressure sensor to the mainline pressure take-off point of the test transmission;
monitoring the transmission fluid pressure of the test transmission;
sensing the immediate drop in the transmission fluid pressure when the test transmission upshifts; and
sensing the momentary surge in the transmission fluid pressure when the test transmission downshifts.

39. The method as set forth in claim 30, wherein the step of determining whether the test transmission shifted within prescribed limits set by the manufacturer of the test transmission comprises the steps of:
storing the prescribed limits set by the manufacturer of the test transmission in a memory means;

accessing portions of the data stored in the memory means as the test transmission is subjected to the test procedure;

sensing the pressure of the transmission fluid in the test transmission;

sensing the input speed of the test transmission;

comparing the sensed pressure and input speed with the data accessed from the memory means; and indicating to the operator of the test procedure whether the data received from the sensors was within the prescribed limits set by the manufacturer of the test transmission.

* * * * *